United States Patent [19]
Hsieh

[11] Patent Number: 5,927,670
[45] Date of Patent: Jul. 27, 1999

[54] INSTRUMENT SUPPORT

[76] Inventor: Wu-Hong Hsieh, No. 46, Lane 59, Chungcheng Rd., Lochou Hsiang, Taipei Hsien, Taiwan

[21] Appl. No.: 09/081,158

[22] Filed: May 18, 1998

[51] Int. Cl.⁶ .................................................. F16M 11/00
[52] U.S. Cl. ............................................. 248/405; 84/421
[58] Field of Search ........................... 248/405, 539, 248/541, 519, 443; 84/521

[56] References Cited

U.S. PATENT DOCUMENTS 4,111,095  9/1978  Simons ................................. 84/422.3
4,796,846  1/1989  Meier et al. ........................... 248/286.1
5,054,357  10/1991 Pyle ............................................ 84/421

*Primary Examiner*—Ramon O. Ramirez
*Attorney, Agent, or Firm*—Welsh & Katz, Ltd.

[57] ABSTRACT

An instrument support has a support, a securing device threadingly connected with the support, a baffle detachably received within the support and a securing tube detachably received within the support and having an extension detachably connected with the baffle. When a pole of a music rest or the like is inserted into the securing tube and the support, threadingly inserted the securing device into the support will force the baffle to move toward the extension of the securing tube and thus the extension will urge the pole and thus achieve a securing effect to the pole.

5 Claims, 5 Drawing Sheets

5,927,670

INSTRUMENT SUPPORT

BACKGROUND OF THE INVENTION

1. Field of the invention

The present invention relates to an instrument support, and more particularly to an instrument support which enables a user to firmly secure a music rest or the like easily.

2. Background

A conventional instrument support is described in Taiwan Patent No. 308343 and shown in FIG. 6. The instrument support comprises a hollow seat 10 and a securing tube 20. The securing tube 20 has a plurality of integral fingers 230 alternately engaged with each other and a longitudinal through hole 211 in communication with a hole 13 of the seat 10. A compartment 14 is defined in the seat 10 by a baffle 115 for receiving a nut 117 therein. A first hole 150 is defined in the baffle 115 and a second hole 121 corresponding to the first hole 150 is defined in the seat 10, such that a threaded rod 41 of a securing device 40 is able to be threadingly inserted into the second hole 121 and the first hole 150. Furthermore, a plate 125 is positioned in the hollow seat 10 and adjacent the alternate fingers 230 when combined. Therefore, when a pole 130 of a music rest (not shown) or the like is inserted into the through hole 211 of the securing tube 20 and the hole 13 of the seat 10, rotating the securing device 40 into the second hole 121 and the first hole 150, the plate 125 will be urged by a free end of the threaded rod 41 to move toward the alternated fingers 230 and thus forces the alternated fingers 230 to deform in a direction toward the pole 30. Because the securing device 40 is positioned by the nut 17 when being inserted through the second hole 112 and the first hole 150 and the plate 125 is urged by the free end of the threaded rod 41 to force the alternated fingers 230 to have a deformation toward the pole 130, the pole 130 is firmly secured by the fingers 230. However, after the alternated fingers 230 have been forced to deform by the plate 125 for several times, the alternated fingers 230 will have a permanent deformation in a direction toward the longitudinal through hole 211 of the securing tube 20. Thus, the communication between the longitudinal through hole 211 of the securing tube 20 and the hole 13 of the seat 10 will be blocked by the deformed alternated fingers 230. It is noted that the instrument support as described and shown herein before is not practically useful and is considered to be a waste from the stand point of the market.

The present invention provides an improved instrument support to obviate and/or mitigate the aforementioned problems.

SUMMARY OF THE INVENTION

The primary object of the invention is to provide an improved music support which enables an user to secure a music rest or the like easily and firmly without worrying deformation and durability thereof.

A further object of the invention is to use an inclined face formed on an outer face of a securing tube to accomplish the securing effect to a pole of the music rest or the like.

Other novel features and advantages of the invention will become more apparent from the following detailed description when taken in conjunction with the accompanying drawings.

DETAILED DESCRIPTION OF THE PREFERRED EMBODIMENT

Figure 1:
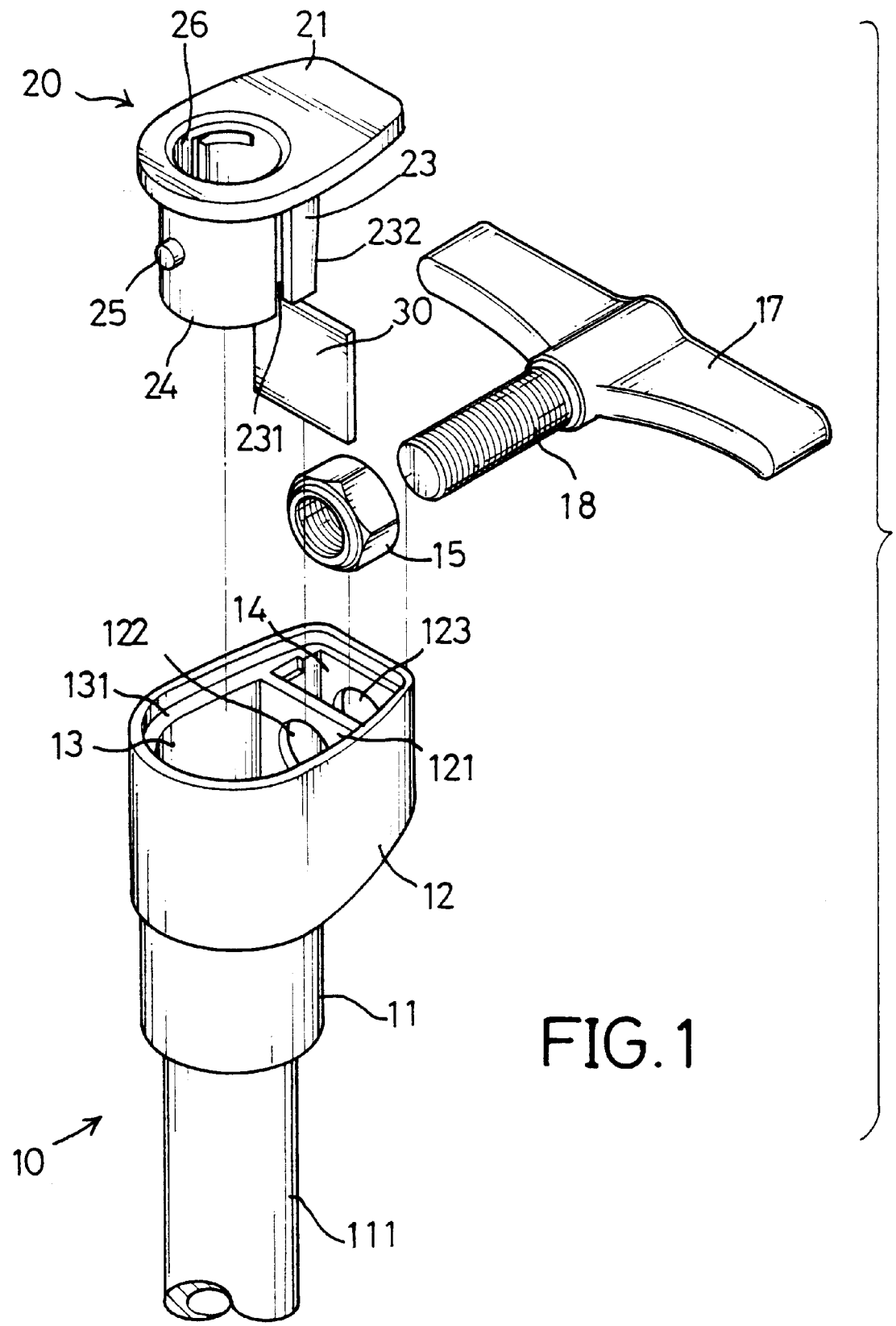
FIG. 1 is an exploded view showing compartments of the present invention.
Figure 2:
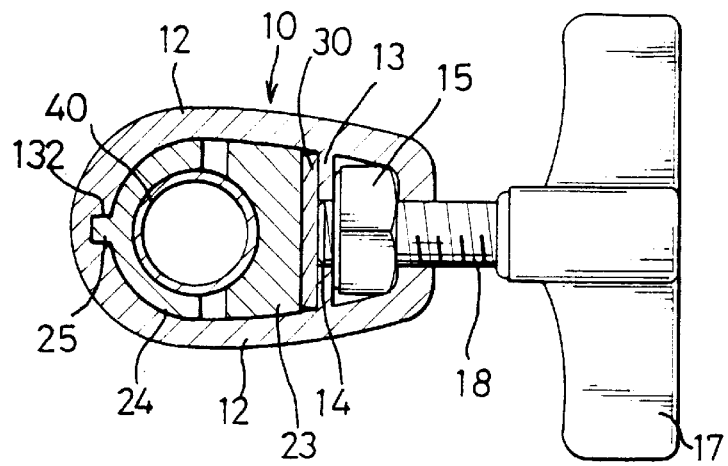
FIG. 2 is a partial cross sectional top view showing interrelationship among parts when combined.

Referring to FIG. 1, it is noted that an instrument support constructed in accordance with the present invention is shown. The instrument support of the invention comprises a support 10, a securing tube 20, a baffle 30 and a securing device 17 having a threaded rod 18 extending therefrom. The support 10 is configured to be hollow and has a first tube 11 extending therefrom and in communication therewith and a second tube 111 extending from the first tube 11 and in communication with the first tube 11. The support 10 further has a seat 12 securely engaged with the first tube 11 and having defined therein a first compartment 13 in communication with the first tube 11 and a second compartment 14 divided from the first compartment 13 by a first plate 121. The first compartment 13 is defined to receive the securing tube 20 therein and the second compartment 14 is defined to receive the nut 15 therein. The first plate 121 is formed within the seat 12 and has a first through hole 122 defined therein. A hole 123 peripherally defined in the seat 12 and corresponding to the first through hole 122 is in communication with the first through hole 122 It is notable that after the nut 15 is disposed in the second compartment 14, the securing device 17 is able to be threadingly inserted into the hole 123, the nut 15 and the first through hole 122 and eventually into the first compartment 13. Furthermore, the seat 12 further has a flange 131 peripherally formed within the seat 12 and the flange 131 has a cutout 132 peripherally defined therein (as shown in FIG. 2). The securing tube 20 has a second through hole 26 defined to correspond to the first compartment 13 of the seat 12 of the support 10 and communicate therewith, a cap 21 circumferentially defined around the second through hole 26 and sized to cover the first compartment 13 and the second compartment 14, a first extension 23 and a second extension 24 both integrally formed with the cap 21 and extending toward the first compartment 13. A gap 231 is defined between the first extension 23 and the second extension 24 and the first extension 23 has an inclined outer face 232. The second extension 24 further has a boss 25 peripherally formed on an outer face thereof and corresponding to the cutout 132 of the flange 131.

Figure 3:
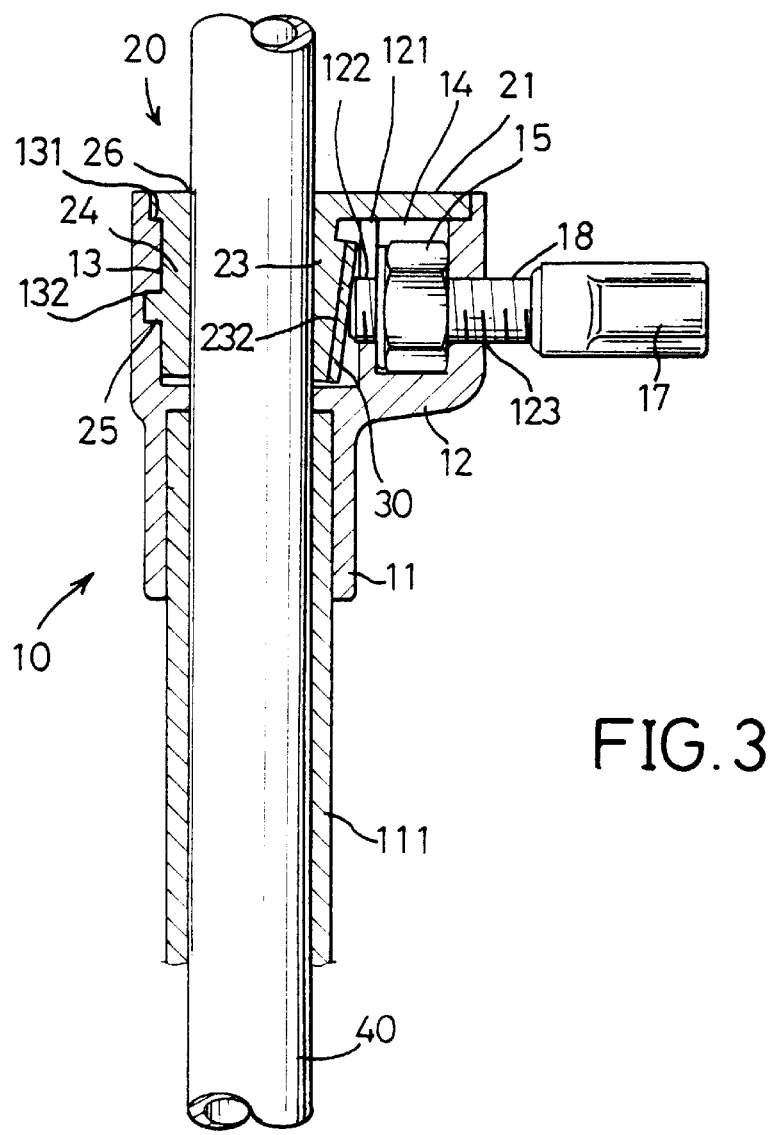
FIG. 3 is a partial cross sectional side view showing the movement of a plate caused by an insertion of a threaded rod.

Referring to FIG. 2, it is to be noted that when in assembly, the baffle 30 is detachably placed into the first compartment 13 and against the first through hole 122 and then the first extension 23 and the second extension 24 of the securing tube 20 are receivably engaged in the first compartment 13 to have the inclined face 232 detachably engage with the baffle 30. Meanwhile, the boss 25 of the second extension 24 is inserted into the cutout 132 of the flange 131 of first compartment 13 in order to secure the securing tube 20 within the first compartment 13. Referring again to FIG. 2 and taking FIG. 3 for reference, it is notable that when the securing device 17 is respectively inserted into the hole 123, the first through hole 122 of the first plate 121 and eventually into the first compartment 13, a free end (not numbered) of the threaded rod 18 will detachably urge the baffle 30 and because of the provision of the gap 231 between the first extension 23 and the second extension 24, the baffle 30 will thus force the first extension 23 to move toward the second extension 24. Therefore, when a pole 40 of a music rest (not shown) or the like is inserted through the second through hole 26 of the securing tube 20, the first compartment 13, the first tube 11 and the second tube 111, the urging force of the baffle 30 to the inclined face 232 of the first extension 23 will thus secure the pole 40.

Figure 4:
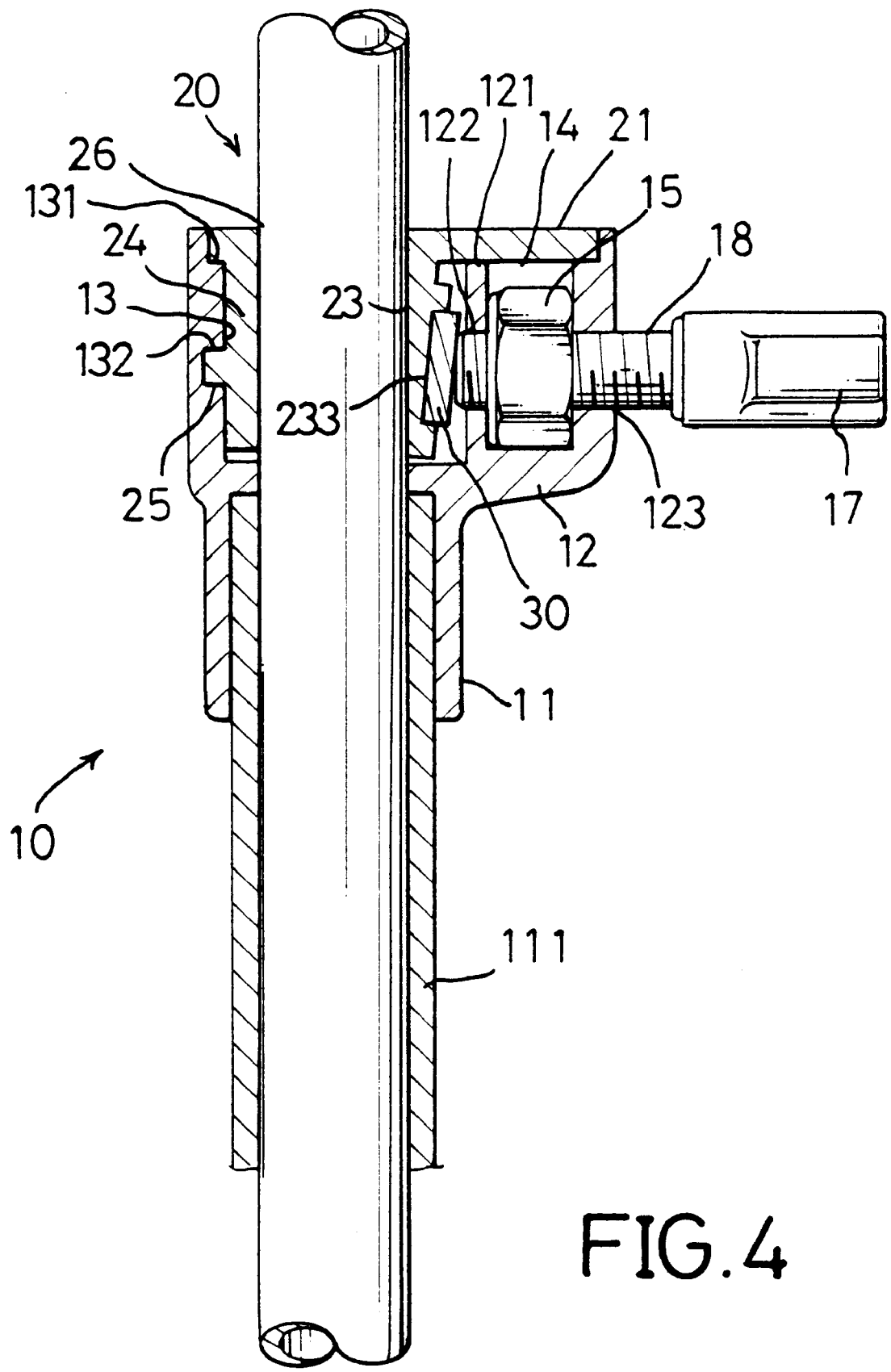
FIG. 4 is a partial cross sectional side view showing alternative embodiment of the present invention.

Another embodiment of the present invention is shown in FIG. 4. The first extension 23 has a recess 233 with an inclined inner face. The recess 233 is configured to mate and receive the baffle 30, such that when the securing device 17 is urging the baffle 30 in a previously described manner, the first extension 23 will be moved toward the second extension 24 and this displacement of the first extension 23 will have the same securing effect to the pole 40.

Figure 5:
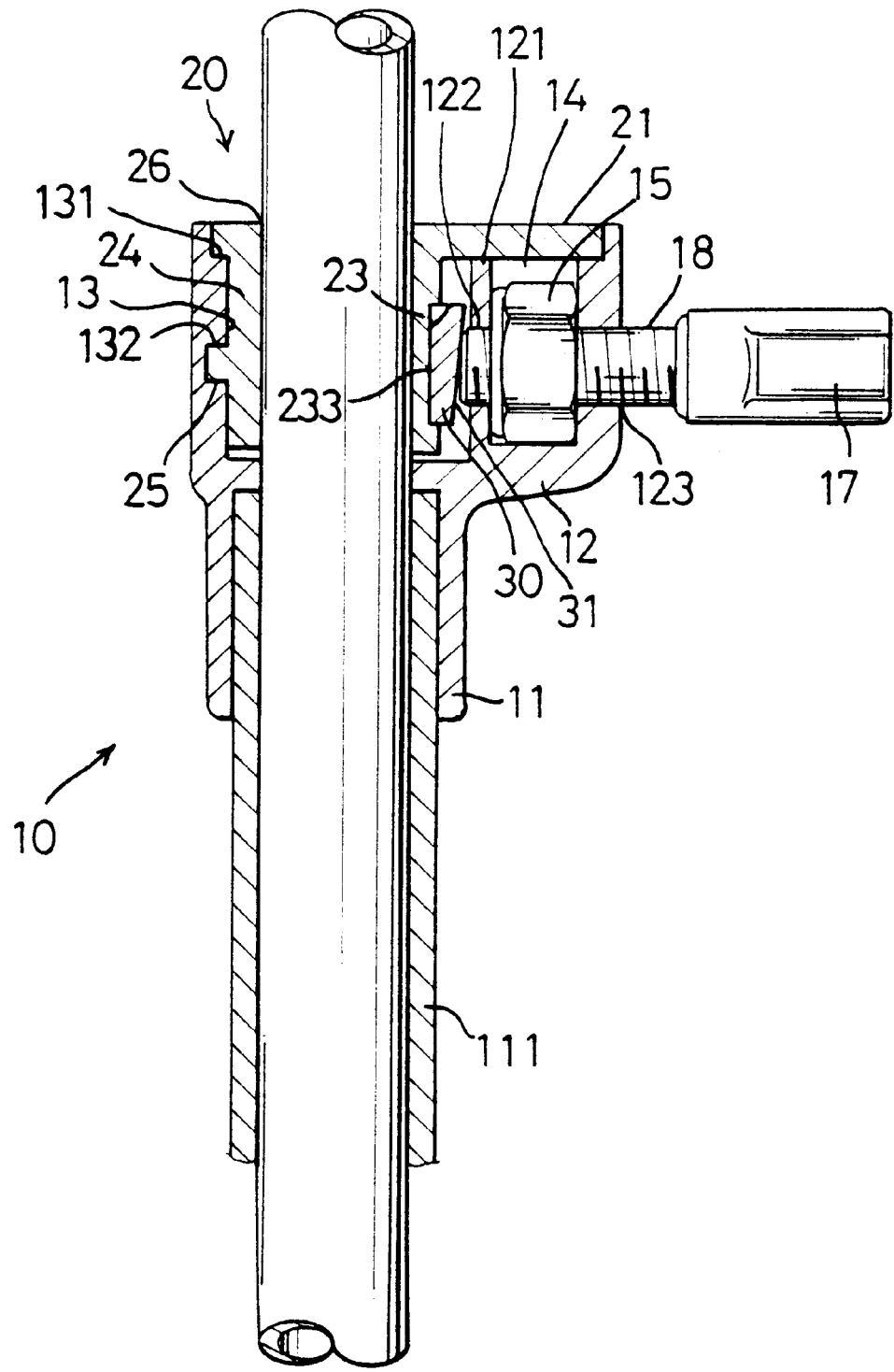
FIG. 5 is a partial cross sectional side view showing still another embodiment of the present invention.
Figure 6:
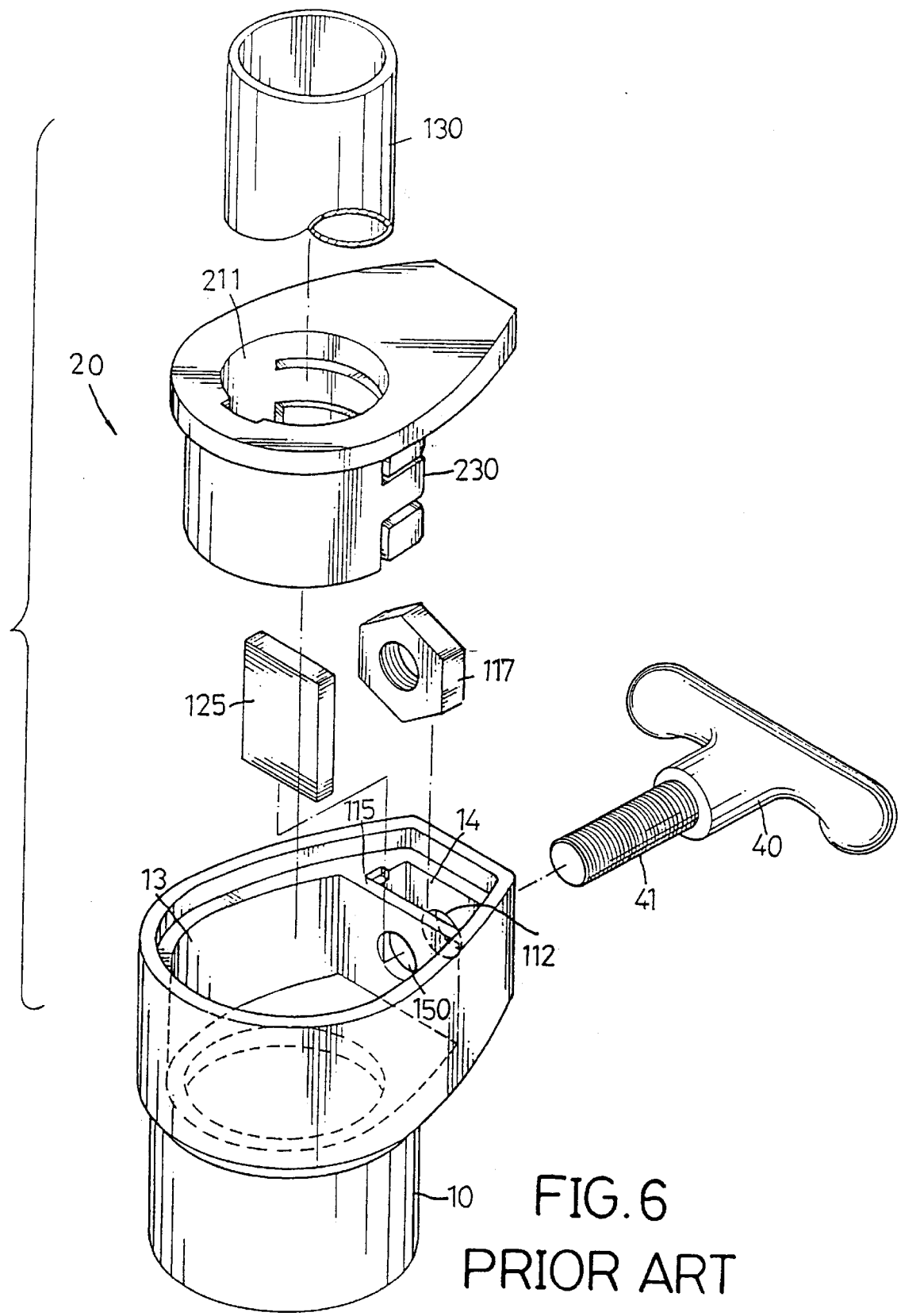
FIG. 6 is an exploded view showing parts of a conventional instrument support.

A further embodiment of the present invention is shown in FIG. 5. It is to be noted that the first extension 23 has a recess 233 and the baffle 30 has an inclined face 31. When the baffle 30 is placed in the first compartment 13, the inclined face 31 of the baffle 30 is facing toward the free end of the threaded rod 18, such that a securing effect will still be achieved to hold the pole 40 in position.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An instrument support comprising:

a support having a first tube, a second tube securely connected and communicating with the first tube and a seat securely connected with the first tube and provided with a first compartment communicating with the first tube and a second compartment divided from the first compartment by a first plate having a first through hole defined therein;

wherein a hole corresponding to the first through hole is peripherally defined in the seat and in communication with the first through hole and a flange is peripherally formed in the seat and has a cutout defined therein;

a securing device having a nut detachably received within the second compartment and a threaded rod threadingly inserted into the hole, the nut, the first through hole and the first compartment;

a baffle placed in the first compartment and adjacent the first plate; and a securing tube detachably received within the first compartment and having a second through hole communicating with the first through hole, and a cap circumferentially formed around the second through hole and detachably engaged with the flange to close the first compartment and the second compartment, wherein the improvements are:

the securing tube further has a first extension detachably connected with the baffle and a second extension both detachably received within the first compartment and extending toward the first through hole of the seat;

the second extension has a peripherally formed boss corresponding to and receivably engaged in the cutout of the flange.

2. The instrument support as claimed in claim 1, wherein the first extension has an inclined outer face connected with the baffle.

3. The instrument support as claimed in claim 1, wherein a gap is defined between the first extension and the second extension.

4. The instrument support as claimed in claim 1, wherein the first extension has a peripherally defined recess mated with the baffle and having an inclined inner face detachably connected with the baffle.

5. The instrument support as claimed in claim 1, wherein the baffle has an inclined outer face detachably connected with the threaded rod of the securing device.

* * * * *